United States Patent
Chang et al.

(10) Patent No.: US 7,334,930 B2
(45) Date of Patent: Feb. 26, 2008

(54) LIGHT GUIDE ELEMENT AND BACKLIGHT MODULE USING THE SAME

(75) Inventors: Chia-Huang Chang, Tu-Cheng (TW); Ming-Fu Hsu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/444,719

(22) Filed: Jun. 1, 2006

(65) Prior Publication Data
US 2006/0274548 A1    Dec. 7, 2006

(30) Foreign Application Priority Data
Jun. 3, 2005    (CN) .................... 2005 1 0035134

(51) Int. Cl.
*F21V 8/00*    (2006.01)
(52) U.S. Cl. .................. 362/602; 362/604; 362/612; 362/616; 362/628; 362/633; 340/815.42
(58) Field of Classification Search .............. 362/602, 362/604, 612, 614, 616, 628, 629, 632, 633; 340/815.42
See application file for complete search history.

(56) References Cited

U.S. PATENT DOCUMENTS

| | | | | |
|---|---|---|---|---|
| 5,746,493 A | * | 5/1998 | Jonsson et al. | 362/602 |
| 6,422,712 B1 | * | 7/2002 | Nousiainen et al. | 362/600 |
| 6,550,927 B1 | * | 4/2003 | Messel | 362/24 |

* cited by examiner

*Primary Examiner*—Laura Tso
(74) *Attorney, Agent, or Firm*—Morris Manning Martin LLP; Tim Tingkang Xia, Esq.

(57) ABSTRACT

A light guide element (100) includes a light guide plate (20) and a frame (23). The light guide plate includes a first guiding portion (21), and a second guiding portion (22) adjoining the first guiding portion. The first guiding portion has a first light-emitting surface (211), a first back surface (212) opposite to the first light-emitting surface, and a light incident surface (210) connecting the first light-emitting surface and the first back surface. The second guiding portion has a second light-emitting surface (221) and a second back surface (222) opposite to the second light-emitting surface. A connecting portion (24) connecting the two guiding portions faces the light incident surface. The frame is integrated with the first guiding portion of the light guide plate.

20 Claims, 2 Drawing Sheets

LIGHT GUIDE ELEMENT AND BACKLIGHT MODULE USING THE SAME

TECHNICAL FIELD

The present invention relates to light guide elements and backlight modules that use light guide elements, such backlight modules typically being incorporated into devices such as liquid crystal displays.

GENERAL BACKGROUND

In recent years, various flat panel displays have gained popular widespread use. A liquid crystal display (LCD) panel is a type of flat panel display device that can be readily mass-produced. The lightness and slimness of LCD panels make them suitable for a wide variety of uses in electronic devices such as personal digital assistants (PDAs), mobile phones, portable personal computers, and other electronic appliances. The liquid crystal of an LCD panel cannot emit light by itself, and so, a backlight module needs to be employed in the LCD panel. In particular, high illumination performance, low power consumption, and a small size are desired. Nowadays, improving the illumination performance has become a key goal for many LCD developers and manufacturers.

In a typical LCD panel, a backlight module provides a surface light source for illuminating the LCD panel. Generally, the backlight module includes a light guide plate and a light source arranged adjacent to one side of the light guide plate. The light guide plate changes light beams received from the light source into surface light beams and directs the surface light beams to a liquid crystal panel of the liquid crystal display.

FIG. 1 shows a conventional backlight module 1 used in an electronic device such as a mobile phone. An electronic device generally includes a LCD panel and a keypad. The backlight module 1 comprises a light guide plate 10 and a point light source 11 deposed adjacent to a corner of the light guide plate 10. The light guide plate 10 includes a light guiding area 105 corresponding to the LCD panel, and defines a plurality of holes 106 corresponding to the keypad and a plurality of curving grooves 107 adjacent to the light guiding area 105. The light guide plate 10 also defines a plurality of grooves 108 around each hole 106 for guiding light. The point light source 11 can emit light beams, and the light beams come out of light guiding area 105 and the hole 106 via the curving grooves 107 and the groove 108 to respectively illuminate the LCD panel and the keypad.

The light guide plate 10 should be assembled to a frame (not shown). Typically, the assembly process is complex, time-consuming, and costly. In addition, the light guide plate 10 and the frame are normally not attached together with a compact fit, thus, exposing gaps that leak light beams emitted from the point light source 11. As a result, the light beams utilization is inefficient and the light guiding area 105 cannot be propagated to its desired effect causing a drop in brightness of the LCD display. Furthermore, because unwanted gaps appears between the light guide plate 10 and the frame, visible bright lines or dark lines occur, causing the brightness distribution of the backlight module 1 to be non-uniform.

What is needed, therefore, is a light guide element and a corresponding backlight module which can provide a more improved brightness and a better uniform brightness distribution.

SUMMARY

A light guide element includes a light guide plate and a frame. The light guide plate includes a first guiding portion and a second guiding portion adjoining the first guiding portion. The first guiding portion has a first light-emitting surface, a first back surface opposite to the first light-emitting surface, and a light incident surface connecting the first light-emitting surface and the first back surface. The second guiding portion has a second light-emitting surface and a second back surface opposite to the second light-emitting surface. A connecting portion facing the light incident surface connects the two guiding portions. The frame is integrated with the first guiding portion of the light guide plate.

A backlight module according to another preferred embodiment of the invention includes the above-described light guide element, and a light source is disposed adjacent to the light incidence surface of the light guide element.

Other advantages and novel features will become more apparent from the following detailed description of preferred embodiments when taken in conjunction with the accompanying drawings.

BRIEF DESCRIPTION OF THE DRAWINGS

Many aspects of light guide element can be better understood with reference to the following drawings. The components in the drawings are not necessarily to scale, the emphasis instead being placed upon clearly illustrating the principles of the light guide element. Moreover, in the drawings, like reference numerals designate corresponding parts throughout the several views.

DETAILED DESCRIPTION OF THE PREFERRED EMBODIMENTS

Figure 1:
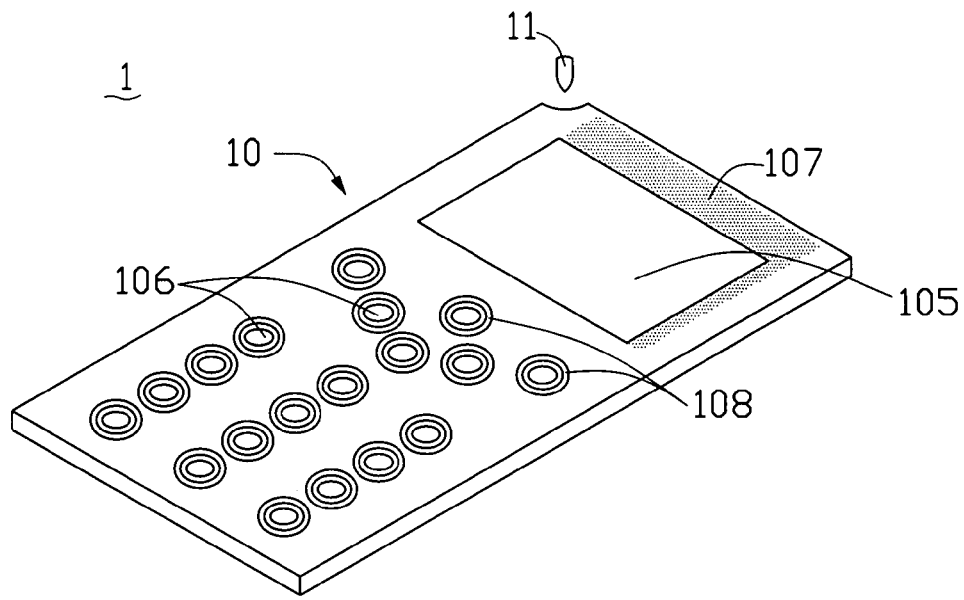
FIG. 1 is a schematic, isometric view of a conventional backlight module.
Figure 2:
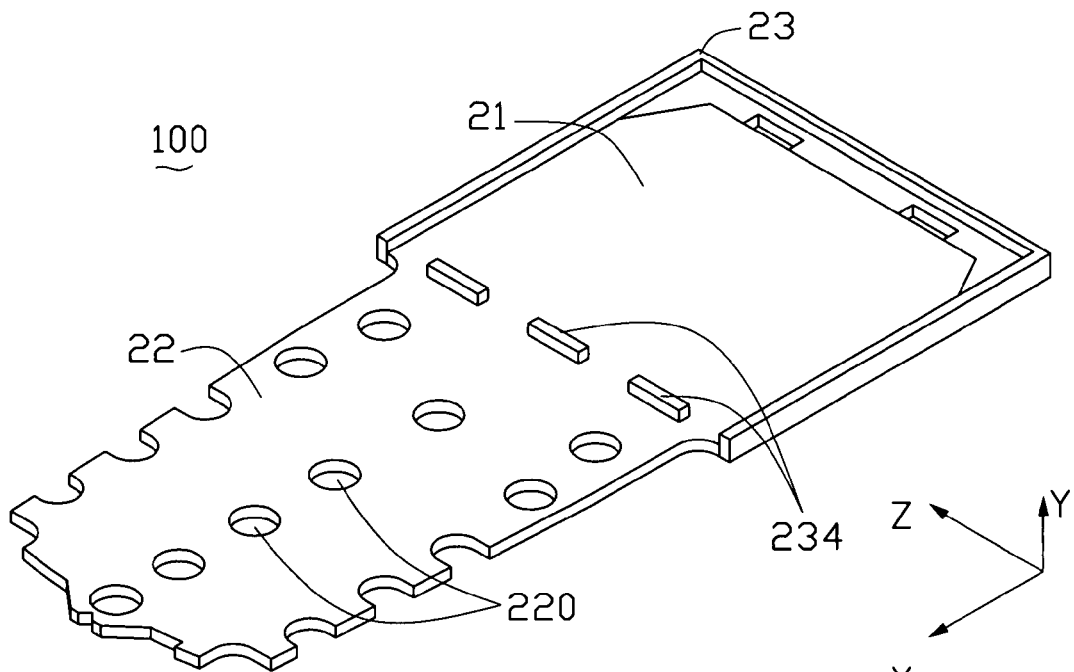
FIG. 2 is a schematic, isometric view of a light guide element according to an embodiment of the present invention.
Figure 3:
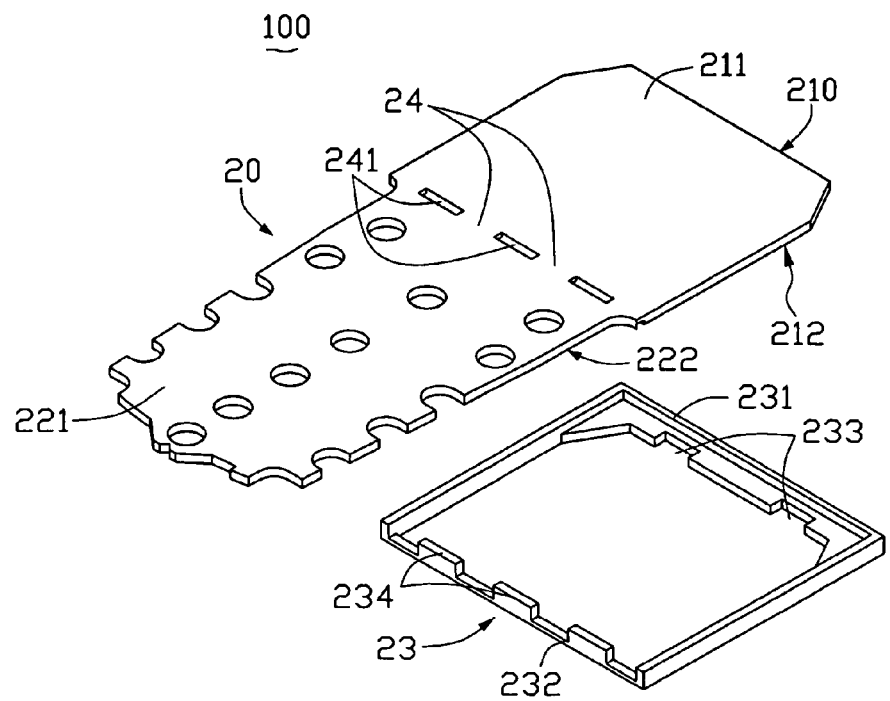
FIG. 3 is an exploded, isometric view of light guide element in FIG. 2.

Referring to FIGS. 2 and 3, a light guide element 100 according to a preferred embodiment of the present invention is shown. The light guide element 100 includes a light guide member like a light guide plate (LGP) 20 and a frame 23. The LGP 20 includes a first guiding portion 21 and a second guiding portion 22 adjoining the first guiding portion 21. The light guide element 100 is used for an electronic device (not shown) like a personal digital assistant (PDA) or a mobile phone that includes a LCD panel as its display and a keypad with input keys. The first guiding portion 21 is used for illuminating the LCD panel and the second guiding portion 22 is used for illuminating the keypad. The second guiding portion 22 defines a plurality of key holes 220 corresponding to input keys on the keypad.

The first guiding portion 21 and the second guiding portion 22 are made from the same transparent materials such as polycarbonate (PC), polymethyl methacrylate (PMMA), a combination of color master batch and PC, and a combination of color master batch and PMMA. The color master batch may have colors such as red, green and yellow, so that the color of the light beams can be changed after the light beams are transmitted out from the first guiding portion 21 and the second guiding portion 22. The first guiding portion 21 has a first light-emitting surface 211, a first back surface 212 opposite to the first light-emitting surface 211, and a light incident surface 210 adjoining the first light-emitting surface 211 and the first back surface 212. The second guiding portion 22 has a second light-emitting surface 221, a second back surface 222 opposite to the second light-emitting surface 221. The first light-emitting surface 211 and the second light-emitting surface 221 are disposed on one side of the light incident surface 210, while the first back surface 212 and the second back surface 222 are disposed on the opposite side of the light incident surface 210. A connecting portion 24 defining a plurality of through holes 241 extends along a direction parallel to the light incident surface 210 for connecting the first guiding portion 21 and the second guiding portion 22 and provides light-communicable paths therein between the first guiding portion 21 and the second guiding portion 22.

The frame 23 is made from materials such as a combination of color master batch and PC, and a combination of color master batch and PMMA. The color master batch is white, so that the light beams cannot pass through the frame 23. The frame 23 includes a first side-wall 231 abutting the light incident surface 210, and a second side-wall 232 parallel to the first side-wall 231. The first side-wall 231 defines at least one receiving groove 233 for receiving a light source. A plurality of protruding portions 234 extends from the second side-wall 232 and received through the corresponding through holes 241 of the connecting portion 24. The frame 23 is integrally manufactured with the first guiding portion 21 by two-shot injection molding technology and has a shape corresponding to the first guiding portion 21.

Figure 4:
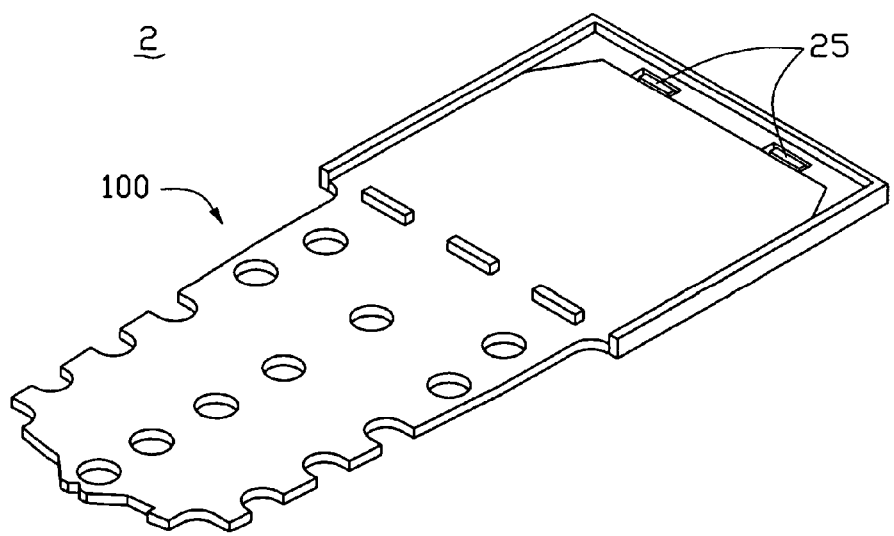
FIG. 4 is a schematic, isometric view of a backlight module according to the present invention, the backlight module comprising the light guide plate of FIG. 2.

Referring to FIG. 4, a backlight module 2 according to a preferred embodiment of the present invention is shown. The back light module 2 includes a light source 25 and a light guide element 100. The light source 25 can be a point light source such as a light emitting diode (LED) or a linear light source such as cold cathode fluorescent lamp (CCFL). The light source 25 is configured in the receiving groove 233. If the first guiding portion 21 and the second guiding portion 22 are made of transparent material, the color of light beams emitting by the light source 25 can not be changed after being transmitted out from the first guiding portion 21 and the second guiding portion 2. If the first guiding portion 21 and the second guiding portion 22 are made from a combination of color master batch and PC, or a combination of color master batch and PMMA, the color of light beams emitting from the light source 25 can be changed after being transmitted out from the first guiding portion 21 and the second guiding portion 2.

In use, a high percentage of light beams emitted by the light source 25 are effectively reflected by the protruding portions 234 and back into the first guiding portion 21 for better illuminating the LCD panel. The light beams not reflected pass through the connecting portion 24 in between the adjacent protruding portions 234 and then are transmitted out from the second light-emitting surface 221 of the second guiding portion 22 illuminating the keypad. In addition, because the frame 23 is integrally manufactured with the first guiding portion 21 of the LGP 20 without unwanted gaps. Thus, light beams loss through the gaps can be eliminated, and the light beams that are transmitted out from the first guiding portion 21 are used efficiently, providing an improved brightness and better uniform illumination for the backlight module 2.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide element comprising:
    a light guide plate including:
    a first guiding portion, having a first light-emitting surface, a first back surface opposite to the first light-emitting surface, and a light incident surface adjoining the first light-emitting surface and the first back surface; and
    a second guiding portion, having a second light-emitting surface, and a second back surface opposite to the second light-emitting surface;
    wherein a connecting portion connects the two guiding portions and extends along a direction parallel to the light incident surface, and a frame integrated with the first guiding portion and surrounding the first guiding portion of the light guide plate.

2. The light guide element according to claim 1, wherein the frame comprises a first side-wall abutting the light incident surface and a second side-wall parallel to the first side-wall.

3. The light guide element according to claim 2, wherein the connecting portion defines a plurality of through holes and a plurality of protruding portions extending from the second side-wall of the frame for being received through the through holes of the connecting portion.

4. The light guide element according to claim 1, wherein the frame has a shape corresponding to the first guiding portion.

5. The light guide element according to claim 1, the frame defines at least one receiving groove for receiving a light source.

6. The light guide element according to claim 1, wherein the first guiding portion and the second guiding portion are made from the same material.

7. The light guide element according to claim 6, wherein the material is one of polycarbonate (PC), polymethyl methacrylate (PMMA), a combination of color master batch and PC, and a combination of color master batch and PMMA.

8. The light guide element according to claim 1, wherein the frame is made from one of a combination of color master batch and PC, and a combination of color master batch and PMMA.

9. A backlight module comprising a light source, and a light guide plate, wherein the light guide plate comprises:
    a first guiding portion, having a first light-emitting surface, a first back surface opposite to the first light-emitting surface, and a light incident surface adjoining the first light-emitting surface and the first back surface;
    a second guiding portion, having a second light-emitting surface, and a second back surface opposite to the second light-emitting surface;
    a connecting portion connecting the two guiding portions and extending along a direction parallel to the light incident surface; and a frame integrated with the first guiding portion and surrounding the first guiding portion of the light guide plate.

10. The backlight module according to claim 9, wherein the light source is light emitting diode (LED).

11. The backlight module according to claim 9, wherein the frame comprises a first side-wall that is in contact with the light incident surface, and a second side-wall parallel to the first side-wall.

12. The backlight module according to claim 11, wherein the connecting portion defines a plurality of through holes and a plurality of protruding portions extend from the second side-wall of the frame for being received through the through holes of the connecting portion.

13. The backlight module according to claim 9, wherein the frame has a shape corresponding to the first guiding portion.

14. The backlight module according to claim 9, the frame defines at least one receiving groove for receiving the light source.

15. The backlight module according to claim 9, wherein the first guiding portion and the second guiding portion are made from the same material.

16. The backlight module according to claim 15, wherein the material is one of polycarbonate (PC), polymethyl methacrylate (PMMA), a combination of color master batch and PC, and a combination including color master batch and PMMA.

17. The backlight module according to claim 9, wherein the frame is made from one of a combination of color master batch and PC, and a combination of color master batch and PMMA.

18. An electronic device comprising:
a display defined along a side of said electronic device for information display of said electronic device;
a keypad defined at said side of said electronic device beside said display for user's input; and
a light source installable in said electronic device for providing light to illuminate said display and said keypad respectively; and
a light guide member installable in said electronic device next to said light source to accept said light from said light source, and extendably neighboring said display and said keypad respectively to emit said light to said display and said keypad, said light guide member defining a first portion to neighbor said display and emit said light to said display through said first portion, and a second portion to neighbor said keypad and emit said light to said keypad through said second portion, a third portion of said light guide member definably located between said first portion and said second portion providing discontinuous light-communicable paths therein between said first portion and said second portion.

19. The electronic device according to claim 18, wherein a frame snugly surrounds said first portion of said light guide member, at least one opaque protruding portion extending from said frame into said third portion of said light guide member to contribute to forming of said light-communicable paths of said third portion.

20. The electronic device according to claim 19, wherein said frame defines at least one receiving groove for receiving said light source.

* * * * *